Dec. 8, 1964    O. ROGG    3,160,065
APPARATUS FOR CROWN SHAVING GEAR
Filed April 12, 1963    4 Sheets-Sheet 4

INVENTOR
Otto Rogg
BY Michael S. Striker
his ATTORNEY 3,160,065
APPARATUS FOR CROWN SHAVING GEAR
Otto Rogg, Munich, Germany, assignor to Carl Hurth
Maschinen- und Zahnradfabrik, Munich, Germany
Filed Apr. 12, 1963, Ser. No. 272,779
Claims priority, application Germany, Apr. 13, 1962,
H 45,470
26 Claims. (Cl. 90—1.6)

The present invention relates to gear shaving machines in general, and more particularly to an improved apparatus which may be installed in or on such machines and which enables the machines to shave the flanks of gear teeth in a novel way. Still more particularly, the invention relates to an apparatus which is especially useful in machines of the type used for crossed-axes crown shaving of gears with comparatively long gear teeth.

Conventional gear shaving machines of which I have knowledge at this time normally shave the gear teeth in such a way that each flank is of convex outline and that such convexity begins at one and terminates at the other axial end of the tooth flank. In other words, each flank comprises a substantially elliptical surface portion which transmits torque to the tooth of a mating gear. Such methods of shaving are acceptable if the gear teeth are comparatively short, as seen in the axial direction of the gear; however, when the gear is one of considerable axial length, a gear tooth with truly convex flanks will be unable to transmit torque to a sufficiently large portion of a mating gear tooth so that the wear on the gear teeth is not uniform and that certain portions of the teeth are often subjected to substantial stresses which may result in excessive wear or in outright destruction of the gear. Expressing the deficiencies of conventional crown shaving machines in another way, the ratio of torque transmitting surface areas to the overall areas of surfaces on gear teeth is too small, especially for gears with long teeth.

Accordingly, it is an important object of my invention to provide an improved gear shaving machine which is constructed and assembled in a novel manner so that it may shave the flanks of gear teeth in such a way that the area of contact between a pair of comparatively long intermeshing gears is much greater than in heretofore known crown shaved gears.

Another object of the invention is to provide a shaving machine which may be used for crown shaving of gears in a conventional manner and which may be rapidly converted for crown shaving of comparatively short or very long gear teeth in the aforementioned novel way.

A further object of the invention is to provide an adjusting arrangement which may be built into or which may be mounted on conventional gear shaving machines in order to convert such machines for crown shaving of exceptionally long gear teeth in such a manner that the area of contact between the teeth of mating gears is much greater than in all crown shaved gears which are known to me at this time.

An additional object of the invention is to provide a gear shaving machine of the above outlined characteristics which, if desired, may be regulated in a fully automatic way so that it may shift from one type to another type of crown shaving or vice versa in response to movements of certain other parts which constitute standard components of a gear shaving machine.

A concomitant object of the instant invention is to provide a gear shaving machine which may be rapidly converted from one to another type of shaving without necessitating lengthy interruptions for such adjustments so that the machine may be installed in series with several additional machines in mass manufacturing plants for gears and similar toothed workpieces.

Still another object of my invention is to provide a shaving machine for spur gears and similar workpieces with longer or shorter gear teeth wherein the aforedescribed improved shaving action may be brought about by means of extremely simple elements such as may be manufactured at very low cost so that the overall cost of the improved machine is increased only slightly and that the additional expenses are more than compensated for by the improved shaving action and by the greatly increased versatility of the machine.

A further object of the invention is to provide a novel process for shaving spur gears and other types of toothed workpieces.

With the above objects in view, one feature of my invention resides in the provision of an apparatus for crown shaving gears and similar workpieces, particularly by the crossed-axes method, which comprises a base or bed, guideways supported by the base and defining an elongated path which is preferably located in a horizontal plane, a slide reciprocably mounted in the guideways and supporting a preferably horizontal pivot member in the form of a shaft or the like, a work table arranged to support a workpiece and tiltably mounted on the pivot member so that it may be rocked at selected intervals in order to insure that the flanks of the gear teeth on the workpiece are crowned in a manner to provide convex end sections and a plano median section on each tooth flank, a device for reciprocating the slide and the work table along the guideways to insure that the tool which mates with the workpiece carries out a shaving action upon the teeth of the workpiece, a tilting device including a first tilting element which is supported by the slide or by the work table and a cooperating second tilting element which is supported by the base, and a mechanical, hydraulic, pneumatic or electrically controlled adjusting arrangement which is operatively connected with the second tilting element and which is constructed and assembled in such a way that it may shift the second tilting element toward the work table in response to movement of the slide in a first direction and to move the second tilting element away from the work table when the slide is caused to move in the opposite direction.

One of the cooperating tilting elements preferably assumes the form of a linear cam having an elongated cam face, and the other tilting element is a roller follower which tracks the cam face and which is permanently biased against the cam by a spring or by another type of suitable resilient means. As a rule, the cam is preferably supported by the base or by an attachment which is secured to the base, and the mounting of the cam on a spindle or on a similar carrier is such that the cam may be tilted about a horizontal axis and that it is also shiftable vertically with or with respect to the carrier toward and away from the work table. In order to insure that only certain sections of the gear teeth are crown shaved, the adjusting arrangement normally shifts the second tilting element shortly before the work table reaches the one or the other of its end positions so that the median section of each tooth flank is shaved without crowning and that rails 38, 38' which engage the end faces of the roller 23 in a manner best shown in FIG. 4. In other words, the track 37 determines the level of the roller 23, whereas the rails 38, 38' control axial movements of this roller.

Figure 4:
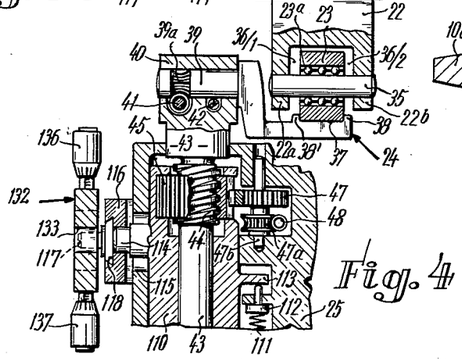

The cam 24 carries a horizontal pin 39 which is rotatably received in a holder or boss 40 provided at the upper end of a vertical carrier here shown as a spindle 43. The mounting of the pin 39 is such that it may rotate in but that it is held against axial movements with respect to the boss 40. A portion 39a of the pin 39 is formed as a worm wheel and meshes with a horizontal worm 41 which is rotatably mounted in the boss 40 and which cooperates with the worm wheel 39a to serve as a means for changing the inclination of the cam track 37 with reference to a horizontal plane, i.e., with reference to the plane in which the slide 12 is reciprocable along the guideways 11a. The worm 41 is provided on a shaft 41a, see FIG. 10a, whose end portion may assume a polygonal shape so that it may be engaged by a suitable tool in order to change the angular position of the pin 39. A suitable arresting device 42, shown in FIG. 4, is provided in the boss 40 and serves to hold the pin 39 against rotation once the latter is adjusted by the parts 39a, 41 to assume a given angular position. The exact construction of the arresting device 42 forms no part of this invention. It goes without saying that the worm 41 may be rotated manually or by a suitable motor, such as a selsyn, a hydraulic motor, or a pneumatic motor, which is detachably connected to the shaft 41a.

The carrier or spindle 43 is formed with a threaded portion 44 which meshes with a spindle nut 45, and the arrangement is such that the spindle cannot rotate in the frame 25. The nut 45 is provided with peripheral teeth which form a gear meshing with a pinion 47 which is mounted on a vertical shaft 47b provided in the interior of the frame 25. The pinion 47 is rigid with a worm wheel 47a which meshes with a worm 48 mounted in the frame 25 and rotatable about a horizontal axis. The nut 45 is mounted in an internal recess of the frame 25 in such a way that it may rotate but that it is held against axial movement. Consequently, when the shaft 48a (see FIG. 10) of the worm 48 is rotated to turn the pinion 47, the nut 45 compels the spindle 43 to move axially with respect to the frame 25 and to move the boss 40 and the cam 24 to a different level. The axial position of the spindle 43 is normally such that the pin 35 is coaxial with the pin 39 when the cam track 37 is located in a horizontal plane. This is of advantage because, when the pin 35 is coaxial with the pin 39, the inclination of the cam 24 may be changed without it being necessary to overcome the bias of the spring 21. The worm 48 may be rotated manually or by means of a suitable reversible motor, not shown. The spindle 43 constitutes but one form of means which may be used to change the distance between the axis of the pin 39 and the underside 138 of the work table 15.

Figures 3, 4A, 5, 6, 7:
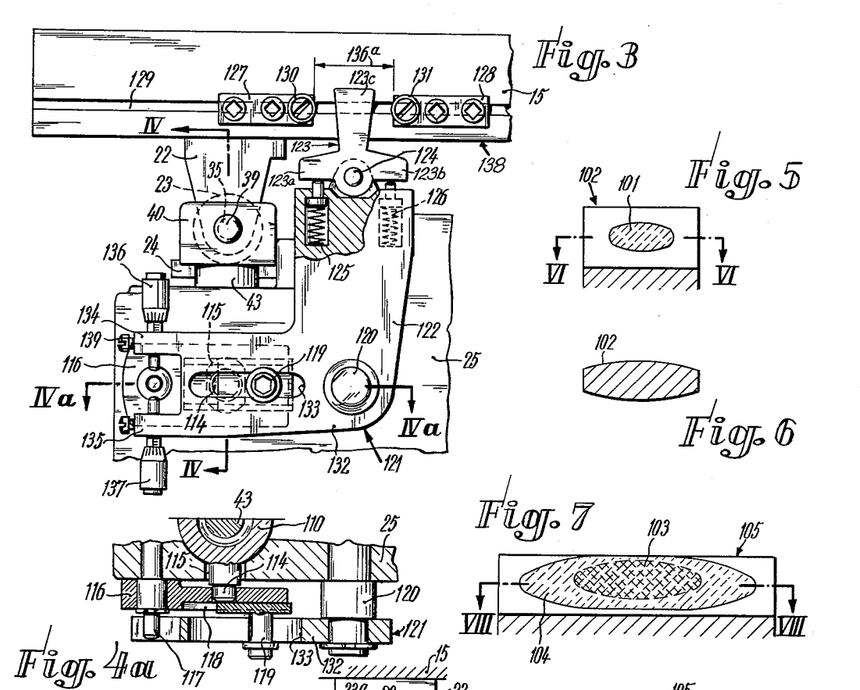

The heretofore described parts of the gear shaving machine are used for crown shaving of gear teeth in a manner as shown in FIGS. 5 and 6. Thus, the flanks of a tooth 102 are of convex shape and the convexity begins at one end face and terminates at the other end face of the tooth. Such shaving is satisfactory in connection with gears of comparatively small axial length. The surface area 101 in FIG. 5 indicates that portion of a tooth flank which is caused to transmit torque to a mating tooth on a cooperating gear.

Figure 1:
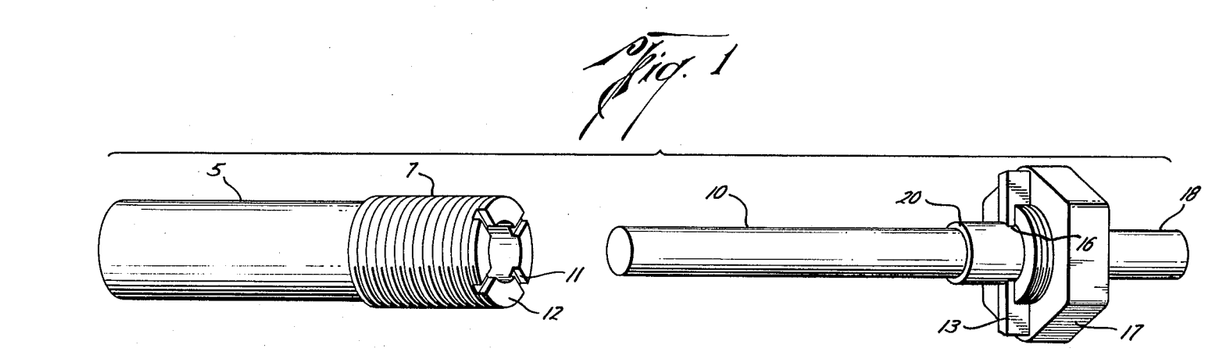
Figure 8:
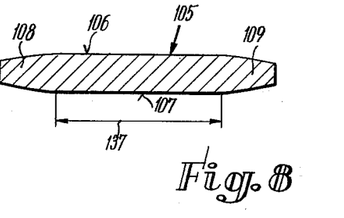

However, when it is necessary to shave workpieces with teeth of considerable axial length, such as the tooth 105 of FIGS. 7 and 8, the comparatively small surface area 103 (corresponding to the area 101 in FIG. 5) would be insufficient for satisfactory transmission of torque. Therefore, the machine of FIG. 1 is further provided with an adjusting arrangement which enables its tool 20 to shave the teeth of a workpiece in such a way that the flanks of a comparatively long gear tooth 105 may be shaved in a manner as shown in FIG. 8. Thus, the area 104 of contact between the tooth 105 and the cooperating tooth on a second gear is much larger than the area 103 or 101, and this is achieved by crowning only the end sections of the flanks, as a 108, 109, and by forming the median sections of the flanks with flat or plano faces 106, 107. The median sections of the flanks on a gear tooth 105 are parallel to each other, i.e., the face 106 is parallel with the face 107.

While it is conceivable to shave the tooth 105 in a manner as shown in FIG. 8 by using a specially configurated cam, I prefer to utilize a linear cam and to provide for controlled pivotal movements of this cam in order to insure that only the end sections 108, 109 of each tooth flank are crowned whereas the median sections of the flanks remain flat. An important advantage of a linear cam is that it may be manufactured at lower cost, that it may be machined with much greater precision than a cam whose track is not located in a flat plane, and that it may be used for special crown shaving of differently dimensioned gears. In other words, the same linear cam may be used in connection with shaving of longer or shorter gears whereas a non-linear cam may be used only with a given type of gears.

The adjusting arrangement for effecting such controlled movements of the linear cam 24 comprises the aforementioned spindle 43 and spindle nut 45, and a vertical sleeve 110 which is mounted in the frame 25 and which permits axial displacements of the spindle. Since the spindle nut 45 is held against axial movement with respect to the sleeve 110, any rotation of this nut will cause axial displacements of the spindle in a known manner when the worm 48 is rotated in a clockwise or anticlockwise direction. The sleeve 110 is biased upwardly by one or more compressed helical springs 111 mounted in the frame 25 and acting against the heads of motion transmitting bolts 112, see FIG. 4. That bolt 112 which is shown in FIG. 4 bears against the underside of a radial projection or lug 113 forming part of or secured to the sleeve 110. The sleeve 110 is further provided with a radially extending stud 114 (see also FIG. 4a) which projects freely through a vertical slot 115 of the frame 25 and which is received in a slot provided in a rockable lever 116. This lever is also pivotable about a pin 117 which is secured to the frame 25 so that the lever 116 will be rocked in a clockwise or in an anticlockwise direction in response to axial movements of the sleeve 110 under or against the bias of the spring 111. FIG. 4 shows that the exposed side of the lever 116 is formed with a horizontal recess 118 which is bounded by dovetailed walls and which receives the head of a pin 119, see FIG. 3 or 4a. This pin 119 is movable in the longitudinal direction of the slot 118 and may be fixed in any of several positions adjustment by an Allen screw or the like, see FIG. 3.

The frame 25 carries a pivot pin 120 for a bell crank lever 121 having an upwardly extending arm 122 which carries at its upper end a bracket for a horizontal pin 124 which supports a rockable finger 123 of inverted T-shape. The horizontal legs 123a, 123b of this finger are biased by a pair of compressed helical springs 125, 126 which are received in upwardly opening blind bores of the arm 122 so that the upwardly extending central leg 123c of the finger 123 normally assumes the neutral position of FIG. 3.

Figure 2:
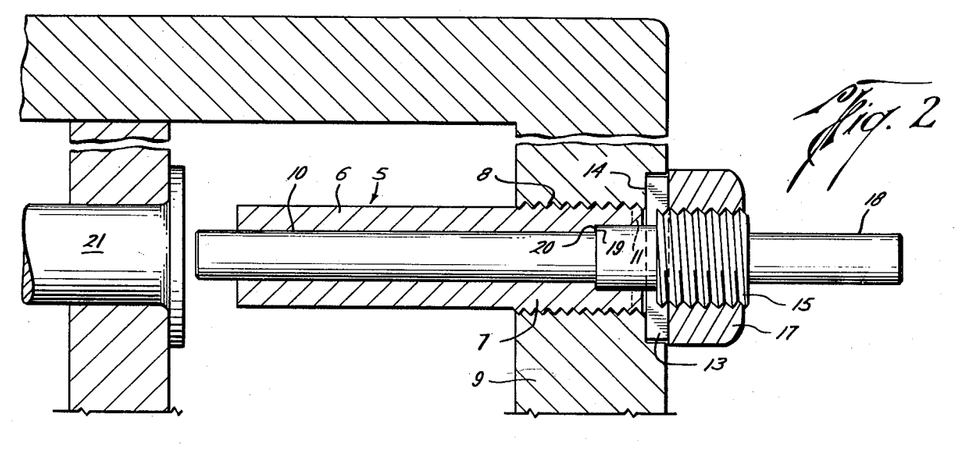

The front side of the work table 15 carries a pair of adjustable stops 127, 128 which are shiftable in a horizontal groove 129 and which may be fixed in selected positions of adjustment so that they are disposed at the opposite sides of the finger 123. The stops 127, 128 are respectively provided with rolls 130, 131 which are rotatable about horizontal axes parallel with the axis of the pin 124 and which may come into abutment with the upwardly extending leg 123c of the finger 123. The axial length of the rolls 130, 131 is sufficient to insure that the finger 123 may be moved into abutment therewith even if the workpiece 16 is moved in a diagonal path 60 which makes an acute angle with the axis 61 of the workpiece and even if the finger moves in the direction indicated by a phantom line 63, see FIG. 2.

The other arm 132 of the bell crank lever 121 is substantially horizontal and is formed with a slot 133 for the end portion of the pin 119. The free end portion of the arm 132 assumes the shape of a fork having prongs 134, 135 which respectively carry micrometer screws 136, 137. The measuring surfaces of the screws 136, 137 are disposed at the opposite sides of and are adjacent to the pin 117 and may be moved into abutment with this pin. Once the position of the screws 136, 137 is adjusted, they may be fixed against rotation by retaining screws 138, 139.

The machine of FIGS. 1 to 4a operates as follows:

The stops 127, 128 are adjusted to assume the positions of FIG. 3 so that the rolls 130, 131 are spaced apart at a distance 136a. This distance 136a equals the length 137 of the flat faces 106, 107 of the gear tooth 105 which is shown in FIG. 8. Precision adjustments are made with the micrometer screws 136, 137 whose measuring surfaces alternatively abut against the pin 117 when the arm 132 of the bell crank lever 121 reaches the one or the other end of its stroke. The pin 119 is adjusted with a view to obtain a desired transmission ratio between the arm 132 and the lever 116.

It is further assumed that the cam face 37 of the linear cam 24 is disposed in a horizontal plane. If the work table 15 performs a forward stroke, the roller follower 23 travels along the came face 37 without causing any tilting of the work table about the axis of the pivot member 14 (i.e., against the bias of the spring 21). However, when the roll 130 comes into abutment with the leg 123c of the finger 123, the bell crank lever 121 begins to pivot in a clockwise direction, as viewed in FIG. 3, and pivots the lever 116 in an anticlockwise direction. Such pivotal movement of the lever 116 causes the stud 114 to move upwardly, as viewed in FIG. 4, whereby the sleeve 110 lifts the spindle nut 45 and the spindle 43 to move the cam 24 upwardly and to cause a predetermined angular displacement of the work table 15 about the axis of the pivot member 14. Such angular displacement of the work table results in tilting of the workpiece 16 against the bias of the spring 21 and causes the tool 20 to crown the tooth 105 as at 108 in FIG. 8. The work table 15 continues to pivot until the measuring surface of the micrometer screw 137 engages the pin 117. Any inaccuracies in the setting of the stop 127 are compensated for by the spring 126 which yields as soon as screw 137 abuts against the pin 117 and permits the finger 123 to pivot in a clockwise direction, as viewed in FIG. 3, provided that the work table 15 continues its forward stroke after the screw 137 engages the pin 117.

The crown 109 at the other axial end of the gear tooth 105 is formed in response to return movement of the work table 15, namely, in a direction to the left, as viewed in FIG. 3. The roll 131 then engages the leg 123c and causes the bell crank lever 121 to pivot in an anticlockwise direction whereby the lever 116 pivots in a clockwise direction about the pin 117 and causes the stud 114 to move downwardly and to entrain the cam 24. The spring 125 yields and permits the finger 123 to pivot in an anticlockwise direction if the work table 15 continues to move after the measuring surface of the micrometer screw 136 engages the pin 117.

Certain modifications of the adjusting arrangement which is shown in FIGS. 3, 4 and 4a are so obvious that they will be readily comprehended without necessitating extensive illustrations. For example, the spindle 43' of the adjusting arrangement which is shown in FIG. 4b may be arranged to rotate with respect to and may be threadedly connected with the holder or boss 40'.

Figure 4B:
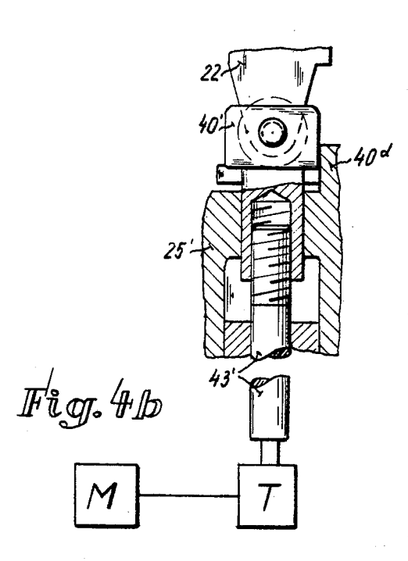

The adjusting arrangement of FIG. 4b also comprises a motor M or the like for rotating the spindle 43' through a transmission T in a clockwise or counterclockwise direction whereby the cam 24 is automatically moved toward or away from the work table. The boss 40' is held against rotation by members 40d and the spindle 43' is rotatable in a bearing 25' which may form part of the base.

Figure 4C:
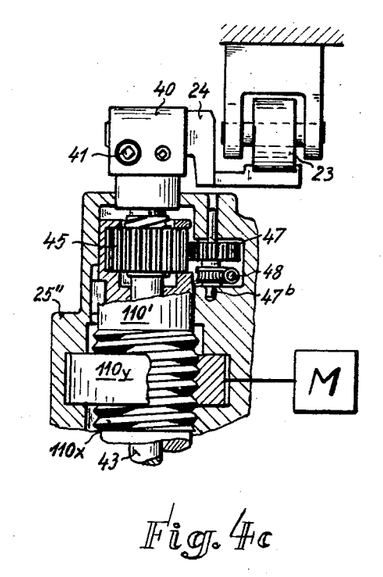

Furthermore, and as shown in FIG. 4c, the projection 113 of FIG. 4 may be replaced by an externally threaded portion 110x of a modified sleeve 110' which thus constitutes a threaded member and which meshes with a second threaded member such as a nut 110y carried by the frame 25" so that the nut 110y may cause the sleeve 110' and the spindle 43 to move with the cam 24 toward or away from the work table. The nut 110y is rotatable by a reversible motor M which may be an electric motor (e.g., a selsyn), a pneumatic motor or a hydraulic motor. The motor M of FIGS. 4b and 4c may be caused to rotate in response to reciprocation of the work table 15 or in response to reciprocation of the slide 12 in a manner similar to that which will be described in connection with FIGS. 9, 9a and 10, 10a.

Of course, it is also possible to mount the cam on the work table 15 or on the slide 12 and to mount the follower roller on the base or on a component which is connected with the base. All that counts is to provide an adjusting arrangement which is capable of tilting the work table and the workpiece when the work table approaches the one or the other end position while moving along certain portions of the path defined by the guideways 11a so that the flanks of the gear teeth on a workpiece will be formed with crown shaved end sections and with a plano central section.

It will be noted that FIGS. 3 to 4c illustrate purely mechanical adjusting arrangements for moving the linear cam 24 in parallelism with itself toward or away from the work table 15 so as to effect tilting of this work table to both sides of a neutral position while the work table moves in its path toward its end positions. Such mechanical adjusting arrangements may be replaced by a fluid-operated adjusting arrangement one form of which is shown in FIGS. 9 and 9a.

The work table 215 has a front side which is formed with two parallel horizontal grooves 229, 229a for a pair of adjustable stops 227, 228. Each of these stops has an inclined cam face 227a, 228a, and each thereof may be fixed in a selected position of adjustment by suitable screws 227b, 228b or the like. The construction of the linear cam 24, of the bearing member 22, of the roller follower 23, of the boss 40, of the spindle 43, of the spindle nut 45 and of the parts 47, 48 is the same as in FIGS. 3 to 4a. However, the sleeve 210 for the spindle 43 is accommodated in a slightly different attachment or frame 225 which defines a cylinder 225a for a double-acting piston 265. This piston is rigid with the sleeve 210 and is received in the cylinder 225a so as to divide the internal space of the cylinder into an upper chamber 266 and a lower chamber 267. The manner in which the sleeve 210 is biased against the nut 45 to avoid any play (see the parts 111–113) is the same as shown in FIG. 4.

Figures 9, 9A:
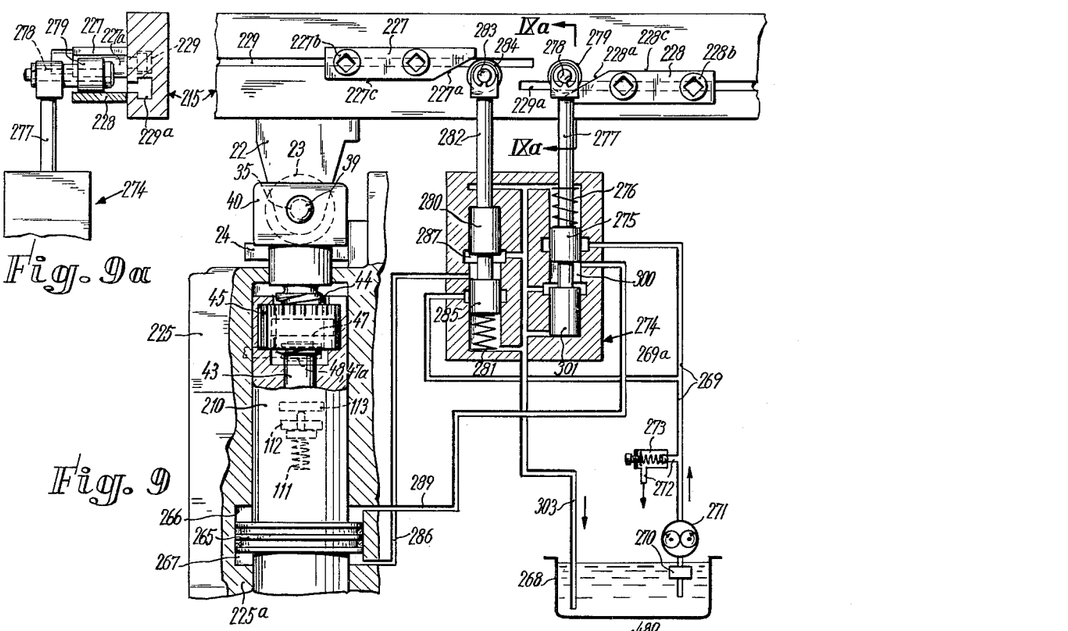

The hydraulic adjusting arrangement of FIGS. 9 and 9a further comprises a source of pressure fluid here shown as an oil tank 268 into which dips the intake end of a supply conduit 269 containing a strainer 270 and a hydraulic pump 271. An overflow conduit 272 which communicates with the supply conduit 269 at a point downstream of the pump 271 and which discharges into the tank 268 contains a pressure relief valve 273 which permits return flow of fluid when the discharge end of the supply conduit 269 is sealed by the piston 275 of a distributor valve 274 which replaces the levers 116, 121 of FIGS. 3–4a. The piston 275 is biased by a spring 276 and is rigidly connected with a piston rod 277 which carries at its upper end a horizontal pin 278 for a roll 279, see FIG. 9a. This roll 279 cooperates with the inclined cam face 228a of the adjustable stop 228 when the work table 215 is caused to perform a stroke in a direction to the left, as viewed in FIG. 9. The spring 276 normally holds the piston 275 in the position of FIG. 9 so that this piston seals the discharge end of the supply conduit 269 and compels the pressure fluid to open the relief valve 273 and to flow back into the tank 268.

The valve 274 comprises a second piston 280 which is biased by a helical spring 281 and which is connected with a piston rod 282 having at its upper end a horizontal pin 283 for a second roll 284 which cooperates with the cam face 227a of the stop 227. When the roll 284 is not engaged by the cam face 227a, the piston rod 282 assumes the position of FIG. 9 under the bias of the spring 281 which compels a second piston 285 on the rod 282 to expose the end of a connecting conduit 286, the latter connecting the left-hand chamber 287 of the valve 274 with the lower cylinder chamber 267. A second connecting conduit 289 connects the upper cylinder chamber 266 with the right-hand chamber 300 of the valve 274. A branch conduit 269a of the supply conduit 269 is sealed from the chamber 287 by the piston 285 when the spring 281 is free to maintain the piston rod 282 in the position of FIG. 9. The piston rod 277 carries a second piston 301 which is coaxial with the piston 275 and which abuts against the bottom wall of the valve 274 when the spring 276 is free to expand, i.e., when the roll 279 is not engaged by the cam face 228a.

The adjusting arrangement of FIGS. 9 and 9a operates as follows:

When the work table 215 moves in a direction to the right, as viewed in FIG. 9, the roll 284 is engaged by the cam face 227a and moves the piston rod 282 against the bias of the spring 281 whereby the piston 280 seals a return conduit 303 of the valve 274 from the connecting conduit 286 and the piston 285 simultaneously exposes the discharge end of the branch conduit 269a so that pressure fluid may flow from the conduit 269, via the conduit 269a and chamber 287 to the connecting conduit 286 and into the lower cylinder chamber 267. The sleeve 210 moves upwardly and entrains the cam 24 so that the left-hand portion of the work table 215 is lifted and the stop 227 (which shares such upward movement of the work table) permits the spring 281 to expand and to return the pistons 280, 285 to the position of FIG. 9. This means that the sleeve 210 arrests the cam 24 in a given position subsequent to crowning of one end portion of a tooth flank. If the work table 215 then continues its movement in a direction to the right, the underside 227c of the stop 227 travels above the roll 284 without causing axial displacement of the piston rod 282. Since the pistons 280, 285 have returned to the positions shown in FIG. 9, the lower cylinder chamber 267 may discharge spent fluid under the bias of the spring 21 through the conduit 286, through the chamber 287 and through the return conduit 303 as soon as the cam face 227a passes beyond the roll 284 during the return stroke of the work table 215.

When the work table moves in a direction to the left, as viewed in FIG. 9, it moves the cam face 228a beneath and against the roll 279 so that the piston rod 277 moves upwardly against the bias of the spring 276 and shifts the pistons 275, 301 to new positions in which the supply conduit 269 may communicate with the upper cylinder chamber 266 (through the chamber 300 and through the connecting conduit 289) whereas the piston 301 seals the connecting conduit 289 from the return conduit 303. Consequently, the piston 265 compels the sleeve 210 and the spindle 43 to move downwardly and to entrain the cam 24 in the same direction so that the work table 215 pivots under the bias of the spring 21 (FIG. 1) and causes the tool to crown the other end portion of a given tooth flank. When the work table 215 is tilted, it moves the stop 228 away from the roll 279 so that the piston rod 277 may return to the position of FIG. 9 and connects the conduit 289 with the return conduit 303 so that spent fluid may escape from the upper cylinder chamber 266. The spring 111 returns the sleeve 210 to the position of FIG. 9 in which the axis of the pin 35 coincides with the axis of the pin 39 (see FIG. 4).

The same sequence of steps is repeated during the next forward and return strokes of the work table 215.

Figures 10, 10A:
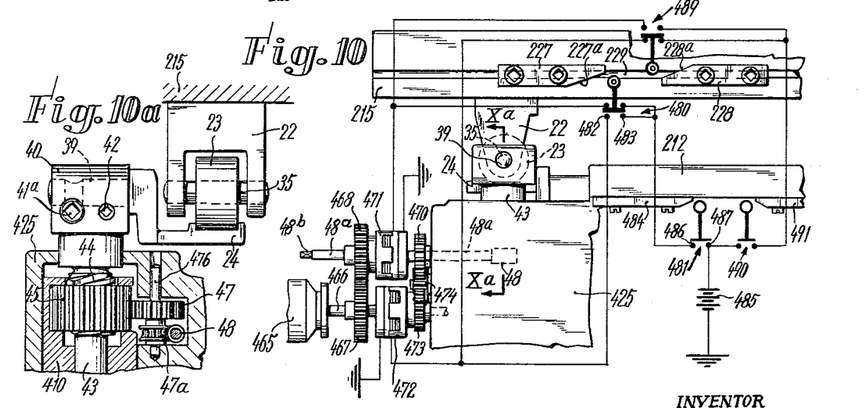

FIGS. 10 and 10a illustrate an electrically operated adjusting arrangement which is utilized to tilt the work table 215. The stops 227, 228 are the same as in FIG. 9 but, instead of axially moving the sleeve 410, the adjusting arrangement of FIGS. 10 and 10a causes axial movements of the spindle 43 in response to rotation of the worm 48. This worm comprises a shaft 41a which may be driven by an electric motor 465. The motor 465 has an output shaft 466 which carries a spur gear 467 meshing with a spur gear 468 on the worm shaft 48a. The spur gear 468 is rigid with the driven clutch element of an electromagnetic clutch 471. The driving clutch element of the clutch 471 is rigid with the worm shaft 48a. A second electromagnetic clutch 472 comprises two clutch elements which are respectively connected with the output shaft 466 and with a spur gear 473. The output shaft 466 is rotatable in the frame 425. The spur gear 473 runs in mesh with an intermediate gear 474 meshing with a spur gear 470 which is rigid with the worm shaft.

When the clutch 471 is energized, the motor 465 drives the worm shaft 48a through the first driving connection which includes the gears 467, 468 and the cooperating elements of the clutch 471. On the other hand, when the clutch 472 is energized, the output shaft 466 drives the worm shaft 48a in the opposite direction via the second driving connection including the clutch 472 and gears 473, 474, 470. Thus, the motor 465 need not be reversible but is still capable of rotating the worm shaft 48a in a clockwise or anticlockwise direction.

Adjacent to the work table 215, there is provided a normally open switch 480 which is connected in circuit with the clutch 472 and which is connected in series with a normally open second switch 481. When the work table 215 moves in a direction to the right, as viewed in FIG. 10, the cam face 227a of the stop 227 (which now serves as a trip) depresses the switch 480 so that this switch bridges the contacts 482, 483. However, the circuit of the clutch 472 remains open because the switch 481 is in open position. This latter switch is depressed when an adjustable trip 484 on the slide 212 (corresponding to the slide 12 of FIG. 1) moves to the right of the position shown in FIG. 10. The circuit further includes a source 485 of electrical energy and the conductors shown in FIG. 10 permit current to flow to the clutch 472 as soon as the switch 481 connects the contacts 486, 487. The motor 465 then drives the worm shaft 48a through the gears 473, 474, 470 and the spindle 43 is caused to move upwardly to lift the cam 24 and to pivot the work table 215 whereby the tool crowns one end portion of a given tooth flank on the workpiece.

A second pair of normally open switches 489, 490 respectively cooperate with the cam face 228a of the stop 228 and with an adjustable trip 491 on the slide 212. The switches 489, 490 are connected in series and the switch 489 closes before the switch 490 so that the motor 465 may rotate the worm shaft 48a through the gears 467, 468 to permit the cam 24 to move downwardly under the bias of the spring 21 as soon as the trip 491 engages and depresses the switch 490.

The worm shaft 48a has a non-circular end portion 48b which may be engaged by a suitable tool to adjust the position of the worm shaft 48a (and the axial position of the spindle 43) independently of the switches 480, 481, 489, 490.

FIG. 10a shows that the frame 425 and the spindle 410 are simplified insofar as the spring or springs 111 may be omited. In fact, the sleeve 410 may form an integral part of the frame 425 because the spindle nut 45 now constitutes the sole means for effecting axial movements of the spindle 43.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for crown shaving gears and similar workpieces, in combination, a base; guideways supported by said base and defining an elongated path; slide means reciprocably mounted in said guideways; a pivot member supported by said slide means; work table means arranged to support a workpiece and tiltably mounted on said pivot member; a device for reciprocating said slide means together with said work table means along said path; a tilting device including a first tilting element supported by one of said means and a cooperating second tilting element supported by said base, one of said elements constituting a cam and the other of said elements constituting a follower adapted to track said cam, said second tilting element being shiftable toward and away from said work table means in a direction substantially at right angles to said path; and an adjusting arrangement operatively connected with said second tilting element for shifting the same toward said work table means in response to movement of said slide means in a first direction and for shifting said second tilting element away from said work table means when said slide means is caused to move in the opposite direction.

2. In an apparatus for crown shaving gears and similar workpieces, in combination, a base; guideways supported by said base and defining an elongated path; slide means reciprocably mounted in said guideways; a pivot member supported by said slide means; work table means arranged to support a workpiece and tiltably mounted on said pivot member; a device for reciprocating said slide means together with said work table means along said path; a tilting device including a first tilting element supported by one of said means and a cooperating second tilting element supported by said base, one of said elements constituting a cam and the other of said elements constituting a follower adapted to track said cam, said second tilting element being shiftable toward and away from said work table means in a direction substantially at right angles to said path; resilient means arranged to bias said first tilting element into engagement with said second tilting element; and an adjusting arrangement operatively connected with said second tilting element for shifting the same toward said work table means in response to movement of said slide means in a first direction and for shifting said second tilting element away from said work table means when said slide means is caused to move in the opposite direction.

3. In an apparatus for crown shaving gears and similar workpieces, in combination, a base; guideways supported by said base and defining an elongated path; slide means reciprocably mounted in said guideways; a pivot member supported by said slide means; work table means arranged to support a workpiece and tiltably mounted on said pivot member; a device for reciprocating said slide means together with said work table means along said path between a first and a second end position; a tilting device including a first tilting element supported by one of said means and a cooperating second tilting element supported by said base, one of said elements constituting a cam having an elongated cam face and the other of said elements constituting a follower adapted to track said cam face, said second tilting element being shiftable toward and away from said work table means in a direction substantially at right angles to said path; resilient means arranged to bias said tilting elements into permanent engagement with each other so that said follower is compelled to track said cam face; and an adjusting arrangement operatively connected with said second tilting element for shifting the same toward said work table means in response to movement of said slide means in a first direction shortly before said slide means reaches said first end position and for shifting said second tilting element away from said work table means when said slide means is caused to move in the opposite direction and while said slide means approaches said second end position whereby the flanks of gear teeth on a workpiece supported by said work table means and mating with a revolving gear-shaped tool are formed with crown shaved end sections and with plano median sections.

4. A combination as set forth in claim 3, wherein said adjusting arrangement comprises a carrier reciprocably supported by said base and supportingly connected with said second tilting element, lever means pivotally connected with said base and arranged to reciprocate said carrier in response to rocking thereof in opposite directions, and a pair of stops secured to said one means and arranged at the opposite sides of said lever means so as to rock said lever means in a first direction when said slide means approaches one of said end positions and to rock said lever means in the opposite direction when said slide means approaches the other end position.

5. A combination as set forth in claim 4, wherein said one means comprises elongated groove means and wherein said stops are adjustable along said groove means so as to regulate the exact time at which said second tilting element is shifted toward and away from said work table means.

6. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and adjusting means for normally maintaining said work table in an untilted neutral position during reciprocating movement thereof, said adjusting means including tilting means for tilting said work table in response to movement of the work table along said path and only when an end portion of a tooth flank on the workpiece is engaged by the shaving tool.

7. A combination as set forth in claim 6, wherein said work table is reciprocable between a pair of end positions and wherein said tilting means is constructed and assembled to tilt said work table in a clockwise direction when the work table approaches one of said end positions and to tilt said work table in an anticlockwise direction when the work table approaches the other end position whereby the flanks of gear teeth on a workpiece supported by the work table and mating with said shaving tool are formed with crown shaved end sections and with substantially plano median sections.

8. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path, and adjusting means for normally maintaining said work table in an untilted neutral position during reciprocating movement thereof, said adjusting means including tilting means for automatically tilting said work table while the work table reciprocates along said path and only when an end portion of a tooth flank on the workpiece is engaged by the shaving tool.

9. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and mechanical adjusting means for normally maintaining said work table in an untilted neutral position during reciprocating movement thereof, said mechanical adjusting means including tilting means for tilting said work table in response to movement of the work table along said path and only when an end portion of a tooth flank on the workpiece is engaged by the shaving tool.

10. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and fluid-operated adjusting means for normally maintaining said work table in an untilted neutral position during reciprocating movement thereof, said fluid-operated adjusting means including tilting means for tilting said work table in response to movement of the work table along said path and only when an end portion of a tooth flank on the workpiece is engaged by the shaving tool.

11. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and electrically operated adjusting means for normally maintaining said work table in an untilted neutral position during reciprocating movement thereof, said electrically operated adjusting means including tilting means for tilting said work table along said path and only when an end portion of a tooth flank on the workpiece is engaged by the shaving tool.

12. In an apparatus for crown shaving gears and similar workpieces, in combination, a base; guideways supported by said base and defining an elongated horizontal path; slide means reciprocably mounted in said guideways; a pivot member rotatably supported by said slide means; work table means arranged to support a workpiece and tiltably mounted on said pivot member; a device for reciprocating said slide means together with said work table means along said path; a tilting device including a first tilting element supported by one of said means and a cooperating second tilting element, one of said elements constituting a cam and the other element constituting a follower adapted to track said cam; a spindle supportingly connected with said second tilting element and shiftable vertically with respect to said base so as to move said second tilting element toward and away from said work table means and to effect tilting of said work table means about said pivot member whereby the flanks of the teeth on a workpiece supported by said work table means and mating with a rotary shaving tool are crown shaved when said work table means is tilted from a neutral position corresponding to a predetermined position of said spindle; and an adjusting arrangement operatively connected with said spindle and constructed to reciprocate the spindle in response to reciprocatory movements of said work table means and said slide means along said path.

13. A combination as set forth in claim 12, wherein said second tilting element is a linear cam having an elongated cam face which is tracked by said follower, said apparatus further comprising horizontal pivot means rockably connecting said linear cam to said spindle and means for adjusting the angular position of said linear cam with respect to said spindle.

14. A combination as set forth in claim 13, further comprising means for arresting said linear cam in selected positions of angular adjustment with respect to said spindle.

15. In an appartus for crown shaving gears and similar workpieces, in combination, a base; guideways supported by said base and defining an elongated horizontal path; slide means reciprocably mounted in said guideways; a a pivot member rotatably supported by said slide means; work table means arranged to support a workpiece and tiltably mounted on said pivot member; a device for reciprocating said slide means together with said work table means along said path; a tilting device including a first tilting element supported by one of said means and a cooperating second tilting element, one of said elements constituting a cam and the other element constituting a follower adapted to track said cam; an externally threaded spindle supportingly connected with said second tilting element and shiftable vertically with respect to said base so as to move said second tilting element toward and away from said work table means and to effect tilting of said work table means about said pivot member whereby the flanks of the teeth on a workpiece supported by said work table means and mating with a rotary shaving tool are crown shaved when said work table means is tilted from a neutral position corresponding to a predetermined position of said spindle; and an adjusting arrangement operatively connected with said spindle and constructed to reciprocate the spindle in response to reciprocatory movements of said work table means and said slide means along said path, said adjusting arrangement comprising a spindle nut rotatably supported by said base and meshing with said spindle, and means for rotating said spindle nut in a clockwise and anticlockwise direction.

16. A combination as set forth in claim 15, wherein the means for rotating said spindle nut comprises an electric motor, a first and second driving connection between said motor and said spindle nut, each of said driving connections comprising a normally inactive electromagnetic clutch, and a pair of electric switches each connected in circuit with one of said clutches and both disposed along the path of said slide means and said work table means so that one thereof is caused to complete the circuit of the respective clutch when the work table means moves toward a first end position and that the other thereof completes the circuit of the respective clutch when the work table means moves toward a second end position, said first and second driving connections respectively rotating said spindle nut in clockwise and anticlockwise directions when the circuits of the respective clutches are completed.

17. In an apparatus for crown shaving gears and similar workpieces, in combination, a base; guideways supported by said base and defining an elongated horizontal path; slide means reciprocably mounted in said guideways; a pivot member rotatably supported by said slide means; work table means arranged to support a workpiece and tiltably mounted on said pivot member; a device for reciprocating said slide means together with said work table means along said path; a tilting device including a first tilting element supported by one of said means and a cooperating second tilting element, one of said elements constituting a cam and the other element constituting a follower adapted to track said cam; an externally threaded spindle supportingly connected with said second tilting element and shiftable vertically with respect to said base so as to move said second tilting element toward and away from said work table means and to effect tilting of said work table means about said pivot member whereby the flanks of the teeth on a workpiece supported by said work table means and mating with a rotary shaving tool are crown shaved when said work table means is tilted from a neutral position corresponding to a predetermined position of said spindle; a first adjusting arrangement comprising a spindle nut meshing with said spindle and means for rotating said spindle nut so as to move said spindle and the second tilting element toward and away from said work table means; and a second adjusting arrangement operatively connected with said spindle and constructed to reciprocate the spindle and said spindle nut in response to reciprocatory movements of said work table means and said slide means along said path.

18. In an apparatus for crown shaving gears and similar workpieces, in combination, a base; guideways supported by said base and defining an elongated horizontal path; slide means reciprocably mounted in said guideways; a pivot member rotatably supported by said slide means; work table means arranged to support a workpiece and tiltably mounted on said pivot member; a device for reciprocating said slide means together with said work table means along said path; a tilting device including a first tilting element supported by one of said means and a cooperating second tilting element, one of said elements constituting a cam and the other element constituting a follower adapted to track said cam; a spindle supportingly connected with said second tilting element and shiftable vertically with respect to said base so as to move said second tilting element toward and away from said work table means and to effect tilting of said work table means about said pivot member whereby the flanks of the teeth on a workpiece supported by said work table means and mating with a rotary shaving tool are crown shaved when said work table means is tilted from a neutral position corresponding to a predetermined position of said spindle; and an adjusting arrangement operatively connected with said spindle and constructed to reciprocate the spindle in response to reciprocatory movements of said work table means and said slide means along said path, said adjusting arrangement comprising a pair of adjustably connected levers each tiltably supported by said base, one of said levers comprising a pair of spaced micrometer screws, a sleeve surrounding said spindle and reciprocable with the spindle relative to said base, a stud connected with said sleeve and received with play between said screws, a spring-biased finger provided on the other lever and adjacent to said path, and a pair of spaced stops supported by said slide means and disposed at the opposite sides of said finger so as to engage said finger and to rock said levers to reciprocate said sleeve via said stud and said screws when the work table means is caused to reciprocate along said path.

19. A combination as set forth in claim 18, further comprising a second adjusting arrangement including means for reciprocating said spindle with respect to said sleeve.

20. A combination as set forth in claim 18, further comprising means for tilting said second tilting element with respect to said spindle.

21. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and adjusting means for normally maintaining said work table in an untilted neutral position during reciprocating movement thereof, said adjusting means including tilting means for tilting said work table in response to movement of the work table along said path and only when an end portion of a tooth flank on the workpiece is engaged by the shaving tool, said tilting means comprising a follower movable with said work table, a cam having a face tracked by said follower, a holder supportingly connected with said cam and having a threaded portion, a threaded spindle meshing with said holder, and means for rotating said spindle so as to move said holder and said cam relative to said work table.

22. In an apparatus for crown shaving gears and similar workpieces, in combination, a base; a work table adapted to support a workpiece and arranged to reciprocate with respect to said base in an elongated path, said work table being tiltable about an axis which is perpendicular to the axis of the workpiece; a rotary shaving tool adjacent to said work table and arranged to remove shavings from the tooth flanks of the workpiece; means for reciprocating said work table along said path; and adjusting means for normally maintaining said work table in an untilted neutral position during reciprocating movement thereof, said adjusting means including tilting means for tilting said work table in response to movement of the work table along said path and only when an end portion of a tooth flank on the workpiece is engaged by the shaving tool, said tilting means comprising a follower movable with said work table, a cam having a face tracked by said follower, a first threaded member supportingly connected with said cam, a second threaded member meshing with said first threaded member, and means for rotating said second threaded member so as to move said first threaded member and said cam toward and away from said work table.

23. In a gear finishing machine, a work table arranged to be tilted about a horizontal axis and to reciprocate between two end positions along an elongated path whose plane is parallel with said axis; and adjusting means for normally maintaining said work table in an untilted neutral position, said adjusting means including tilting means for tilting said work table in response to reciprocation of the work table along a predetermined portion of said path and only while said work table approaches said end positions.

24. In a gear finishing machine, particularly in a machine for crown shaving gears by the crossed-axes method, in combination, elongated guideways defining a horizontal path; a work table reciprocable along said path between a pair of spaced end positions and tiltable about a horizontal axis to both sides of a neutral position in which the work table is disposed in a substantially horizontal plane; and adjusting means for normally maintaining said work table in said neutral position during reciprocation thereof, said adjusting means including tilting means for alternatively tilting said work table to the one and to the other side of said neutral position in response to movement of the work table along said path and at the time the work table respectively approaches the one and the other of said end positions whereby the tooth flanks of the workpiece are crown shaved only when the work table is out of said neutral position.

25. A process of crown shaving gears and similar workpieces, comprising the steps of bringing a rotary workpiece into mesh with rotary shaving tool so that the axis of the workpiece crosses in space the axis of the tool; reciprocating the workpiece along a path which is parallel with the axis thereof so that the workpiece moves between a pair of spaced end positions and is normally maintained in a neutral position at a constant distance from the shaving tool; tilting the workpiece in one direction about an axis which is perpendicular to the axis thereof in response to movement of the workpiece toward one of said end positions so that the distance between the workpiece and the tool changes; and tilting the workpiece in the opposite direction in response to movement of the workpiece toward the other end position to thereby change the distance between the workpiece and the tool whereby the tooth flanks of the workpiece are crown shaved only when the workpiece is tilted and the remainder of each tooth flank on the workpiece is substantially plano.

26. A process as set forth in claim 25, wherein the workpiece is alternatively tilted to the opposite sides of said neutral position at the time it moves in predetermined sections of said path.

References Cited by the Examiner

UNITED STATES PATENTS

| 2,249,251 | 7/41 | Mentley | 90—1.6 |
| 2,362,764 | 11/44 | Miller | 90—1.6 |
| 2,397,515 | 4/46 | Staub | 90—1.6 |
| 2,542,569 | 2/51 | Praeg | 90—1.6 |
| 2,762,268 | 9/56 | Maurer | 90—1.6 |

FOREIGN PATENTS

| 880,843 | 6/53 | Germany. |
| 1,115,106 | 10/61 | Germany. |

WILLIAM W. DYER, Jr., *Primary Examiner.*

Clivy R. Phillips
INVENTOR.

ATTORNEYS